United States Patent
Kang et al.

(10) Patent No.: US 9,829,237 B2
(45) Date of Patent: Nov. 28, 2017

(54) HEAT PUMP SYSTEM FOR VEHICLE AND METHOD OF CONTROLLING THE SAME

(71) Applicant: Hanon Systems, Daejeon (KR)

(72) Inventors: Sungho Kang, Daejeon (KR); Hakkyu Kim, Daejeon (KR); Youngho Choi, Daejeon (KR); Jungjae Lee, Daejeon (KR); Taeeun Kim, Daejeon (KR); Jeonghun Seo, Daejeon (KR)

(73) Assignee: Hanon Systems, Daejeon (KR)

( * ) Notice: Subject to any disclaimer, the term of this patent is extended or adjusted under 35 U.S.C. 154(b) by 291 days.

(21) Appl. No.: 14/880,559

(22) Filed: Oct. 12, 2015

(65) Prior Publication Data

US 2016/0033193 A1 Feb. 4, 2016

Related U.S. Application Data

(62) Division of application No. 13/781,979, filed on Mar. 1, 2013, now abandoned.

(30) Foreign Application Priority Data

Mar. 5, 2012 (KR) .................. 10-2012-0022251
Mar. 5, 2012 (KR) .................. 10-2012-0022252
(Continued)

(51) Int. Cl.
*F25D 21/00* (2006.01)
*B60H 1/00* (2006.01)
(Continued)

(52) U.S. Cl.
CPC ....... *F25D 21/006* (2013.01); *B60H 1/00785* (2013.01); *B60H 1/00914* (2013.01);
(Continued)

(58) Field of Classification Search
CPC ........ F25D 21/002; F25B 30/02; F25B 41/00; B60H 2001/224; B60H 2001/3261;
(Continued)

(56) References Cited

U.S. PATENT DOCUMENTS 4,770,000 A 9/1988 Kuroda et al.
5,299,431 A 4/1994 Iritani et al.
(Continued)

FOREIGN PATENT DOCUMENTS

CN 1932417 A 3/2007
EP 1 072 453 A2 1/2001
(Continued)

*Primary Examiner* — Jianying Atkisson
*Assistant Examiner* — Joel Attey
(74) *Attorney, Agent, or Firm* — Norton Rose Fulbright US LLP

(57) ABSTRACT

Disclosed therein are a heat pump system for a vehicle and a method of controlling the heat pump system, which determines that frosting begins on an exterior heat exchanger and carries out a defrosting control if a difference value between outdoor temperature and refrigerant temperature of an outlet side of the exterior heat exchanger is above a frosting decision temperature in a heat pump mode, thereby increasing frost-prevention and defrosting effects and enhancing heating performance and stability of the system because the system recognizes the beginning of frosting on the exterior heat exchanger at a proper time so as to carry out the defrosting control.

7 Claims, 12 Drawing Sheets

| (30) | Foreign Application Priority Data |
|---|---|
| Mar. 5, 2012 (KR) | 10-2012-0022259 |
| Mar. 5, 2012 (KR) | 10-2012-0022261 |

(51) Int. Cl.
*F25D 21/12* (2006.01)
*F25B 30/02* (2006.01)
*F25B 47/02* (2006.01)
*B60H 1/32* (2006.01)
*F25B 41/00* (2006.01)
*B60H 1/22* (2006.01)

(52) U.S. Cl.
CPC ......... *B60H 1/00921* (2013.01); *F25B 30/02* (2013.01); *F25B 47/022* (2013.01); *F25D 21/002* (2013.01); *F25D 21/12* (2013.01); *B60H 1/321* (2013.01); *B60H 2001/00949* (2013.01); *B60H 2001/224* (2013.01); *B60H 2001/326* (2013.01); *B60H 2001/3252* (2013.01); *B60H 2001/3261* (2013.01); *B60H 2001/3263* (2013.01); *F25B 41/00* (2013.01); *F25B 2400/0409* (2013.01); *F25B 2400/0411* (2013.01)

(58) Field of Classification Search
CPC ...... B60H 2001/326; B60H 2001/3263; B60H 2001/3252; B60H 1/321
USPC .......................................................... 62/140
See application file for complete search history.

(56) References Cited

U.S. PATENT DOCUMENTS

| 5,542,271 | A | 8/1996 | Kudoh et al. |
| 5,642,627 | A | 7/1997 | Iritani et al. |
| 6,314,750 | B1 | 11/2001 | Ishikawa et al. |
| 6,347,528 | B1 | 2/2002 | Iritani et al. |
| 6,430,951 | B1 | 8/2002 | Iritani et al. |
| 7,228,692 | B2 | 6/2007 | Concha et al. |
| 2005/0172648 | A1 | 8/2005 | Concha et al. |
| 2012/0060530 | A1 | 3/2012 | Shimoda et al. |
| 2013/0081419 | A1 | 4/2013 | Yoshiki et al. |

FOREIGN PATENT DOCUMENTS

| JP | 2000-283611 A | 10/2000 |
| JP | 2001-027455 A | 1/2001 |
| JP | 2001-030744 A | 2/2001 |
| JP | 3538845 B2 | 6/2004 |
| JP | 2005-98660 A | 4/2005 |
| JP | 2012-017092 A | 1/2012 |
| KR | 950012152 B1 | 10/1995 |
| KR | 20040093632 A | 11/2004 |
| KR | 10-20040041442 A | 5/2005 |
| KR | 20120016151 A | 2/2012 |

HEAT PUMP SYSTEM FOR VEHICLE AND METHOD OF CONTROLLING THE SAME

This application is a division of U.S. patent application Ser. No. 13/781,979 filed Mar. 1, 2013, pending, which claims priority from Korean Patent Application Nos. 10-2012-0022251 filed Mar. 5, 2012, 10-2012-0022252 filed Mar. 5, 2012, 10-2012-0022259 filed Mar. 5, 2012, and 10-2012-0022261 filed Mar. 5, 2012, each of which is incorporated herein by reference in its entirety for all purposes.

BACKGROUND OF THE INVENTION

Field of the Invention

The present invention relates to a heat pump system for a vehicle and a method of controlling the same, and more particularly, to a heat pump system for a vehicle and a method of controlling the heat pump system, which determines that frosting begins on an exterior heat exchanger and carries out a defrosting control if a difference value between outdoor temperature and refrigerant temperature of an outlet side of the exterior heat exchanger is above a frosting decision temperature in a heat pump mode.

Background Art

In general, an air conditioner for a vehicle includes a cooling system for cooling the interior of the vehicle and a heating system for heating the interior of the vehicle. At an evaporator side of a refrigerant cycle, the cooling system converts air into cold air by heat-exchanging the air passing outside an evaporator with refrigerant flowing inside the evaporator so as to cool the interior of the vehicle. At a heater core side of a cooling water cycle, the heating system convers air into warm air by heat-exchanging the air passing outside the heater core with cooling water flowing inside the heater core so as to heat the interior of the vehicle.

In the meantime, differently from the air conditioner for the vehicle, a heat pump system which can selectively carry out cooling and heating by converting a flow direction of refrigerant using one refrigerant cycle has been applied. For instance, the heat pump system includes two heat exchangers: one being an interior heat exchanger mounted inside an air-conditioning case for heat-exchanging with air blown to the interior of the vehicle; and the other one being an exterior heat exchanger for heat-exchanging outside the air-conditioning case, and a direction-adjustable valve for changing a flow direction of refrigerant. Therefore, according to the flow direction of the refrigerant by the direction-adjustable valve, the interior heat exchanger serves as a heat exchanger for cooling when the cooling mode is operated, and serves as a heat exchanger for heating when the heating mode is operated.

Various kinds of the heat pump system for the vehicle have been proposed, and FIG. 1 illustrates a representative example of the heat pump system for the vehicle.

As shown in FIG. 1, the heat pump system for the vehicle includes: a compressor 30 for compressing and discharging refrigerant; a high-pressure side heat exchanger 32 for radiating heat of the refrigerant discharged from the compressor 30; a first expansion valve 34 and a first bypass valve 36 mounted in parallel for selectively passing the refrigerant passing through the high-pressure side heat exchanger 32; an exterior heat exchanger 48 for heat-exchanging the refrigerant passing through the first expansion valve 34 or the first bypass valve 36 outdoors; a low-pressure side heat exchanger 60 for evaporating the refrigerant passing through the exterior heat exchanger 48; an accumulator 62 for dividing the refrigerant passing through the low-pressure side heat exchanger 60 into a gas-phase refrigerant and a liquid-phase refrigerant; an interior heat exchanger 50 for heat-exchanging refrigerant supplied to the low-pressure side heat exchanger 60 with refrigerant returning to the compressor 30; a second expansion valve 56 for selectively expanding the refrigerant supplied to the low-pressure side heat exchanger 60; and a second bypass valve 58 mounted in parallel with the second expansion valve 56 for selectively connecting an outlet side of the exterior heat exchanger 48 and an inlet side of the accumulator 62.

In FIG. 1, the reference numeral 10 designates an air-conditioning case in which the high-pressure side heat exchanger 32 and the low-pressure side heat exchanger 60 are embedded, the reference numeral 12 designates a temperature-adjustable door for controlling a mixed amount of cold air and warm air, and the reference numeral 20 designates a blower mounted at an inlet of the air-conditioning case.

According to the heat pump system having the above structure, when a heat pump mode (heating mode) is operated, the first bypass valve 36 and the second expansion valve 56 are closed, and the first expansion valve 34 and the second bypass valve 58 are opened. Moreover, the temperature-adjustable door 12 is operated as shown in FIG. 1. Accordingly, the refrigerant discharged from the compressor 30 passes through the high-pressure side heat exchanger 32, the first expansion valve 34, the exterior heat exchanger 48, a high pressure side 52 of the interior heat exchanger 50, the second bypass valve 58, the accumulator 62, and a low pressure side 54 of the interior heat exchanger 50 in order, and then, is returned to the compressor 30. That is, the high-pressure side heat exchanger 32 serves as a heater and the exterior heat exchanger 48 serves as an evaporator.

When an air-conditioning mode (cooling mode) is operated, the first bypass valve 36 and the second expansion valve 56 are opened, and the first expansion valve 34 and the second bypass valve 58 are closed. Furthermore, the temperature-adjustable door 12 closes a passage of the high-pressure side heat exchanger 32. Therefore, the refrigerant discharged from the compressor 30 passes through the high-pressure side heat exchanger 32, the first bypass valve 36, the exterior heat exchanger 48, the high pressure side 52 of the interior heat exchanger 50, the second expansion valve 56, the low-pressure side heat exchanger 60, the accumulator 62, and the low pressure side 54 of the interior heat exchanger 50 in order, and then, is returned to the compressor 30. That is, the low-pressure side heat exchanger 360 serves as an evaporator and the high-pressure side heat exchanger 32 closed by the temperature-adjustable door 12 serves as a heater in the same with the heat pump mode.

However, in the heat pump mode (heating mode), the conventional heat pump system for the vehicle carries out heating because the high-pressure side heat exchanger 32 serves as a heater, and the exterior heat exchanger 48 is mounted outside the air-conditioning case 10, namely, at the front side of an engine room of the vehicle, and serves as an evaporator for heat-exchanging with the outdoor air.

In this instance, temperature of the refrigerant introduced into the exterior heat exchanger 48 lowers below the freezing point while the refrigerant heat-exchanges with the outdoor air, so that frosting begins on the surface of the exterior heat exchanger 48.

If frosting on the surface of the exterior heat exchanger 48 is expanded continuously, because the exterior heat exchanger 48 cannot absorb heat, temperature and pressure of the refrigerant inside the system lower, and hence, the heating performance is remarkably reduced since temperature of air discharged to the interior of the vehicle lowers, and stability of the system is also decreased due to introduction of liquid refrigerant into the compressor.

SUMMARY OF THE INVENTION

Accordingly, the present invention has been made to solve the above-mentioned problems occurring in the prior arts, and it is an object of the present invention to provide a heat pump system for a vehicle and a method of controlling the heat pump system, which determines that frosting begins on an exterior heat exchanger and carries out a defrosting control if a difference value between outdoor temperature and refrigerant temperature of an outlet side of the exterior heat exchanger is above a frosting decision temperature in a heat pump mode, thereby increasing frost-prevention and defrosting effects and enhancing heating performance and stability of the system because the system recognizes the beginning of frosting on the exterior heat exchanger at a proper time so as to carry out the defrosting control.

To achieve the above objects, the present invention provides a heat pump system for a vehicle comprising: a compressor mounted on a refrigerant circulation line for compressing and discharging refrigerant; an interior heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; an exterior heat exchanger mounted outside the air-conditioning case for exchanging heat between the refrigerant circulating through the refrigerant circulation line and the outdoor air; first expansion means mounted on the refrigerant circulation line of an inlet side of the evaporator for expanding refrigerant; second expansion means mounted on the refrigerant circulation line located between the interior heat exchanger and the exterior heat exchanger for expanding refrigerant; and a controlling part for controlling the heat pump system to defrost after determining that frosting is formed on the external heat exchanger if a difference value between outdoor temperature and refrigerant temperature of an outlet side of the exterior heat exchanger is above a frosting decision temperature in a heat pump mode.

In another aspect of the present invention, the present invention provides a method of controlling a heat pump system for a vehicle comprising the steps of: determining whether or not the heat pump system is in a heat pump mode; as the determination result of the step, when the system is in the heat pump mode, determining whether or not a difference value between outdoor temperature and refrigerant temperature of an outlet side of the exterior heat exchanger is above a frosting decision temperature; and as the determination result of the step, when the difference value is above the frosting decision temperature, controlling the heat pump system to defrost after determining that frosting is formed on an external heat exchanger.

In the heat pump mode, if the difference value between outdoor temperature and refrigerant temperature of the outlet side of the exterior heat exchanger is above the frosting decision temperature, the present invention decides that frosting begins on an exterior heat exchanger and carries out the defrosting control, thereby increasing frost-prevention and defrosting effects and enhancing heating performance and stability of the system because the system recognizes the beginning of frosting on the exterior heat exchanger at a proper time so as to carry out the defrosting control.

Moreover, the present invention variably sets the frosting decision temperature by outdoor temperature and judges frosting of the exterior heat exchanger so as to judge frosting by outdoor temperature with a high accuracy.

Furthermore, if the difference value ($\Delta T$) is above the frosting decision temperature, the present invention additionally judges a waste heat of electronic units of the vehicle, refrigerant pressure of the inlet side of the exterior heat exchanger, or a decrease range of discharge air temperature of the interior of the vehicle and uses it in determining frosting on the exterior heat exchanger so as to increase accuracy more in determination of frosting on the exterior heat exchanger and enhance frost-prevention and defrosting effects.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
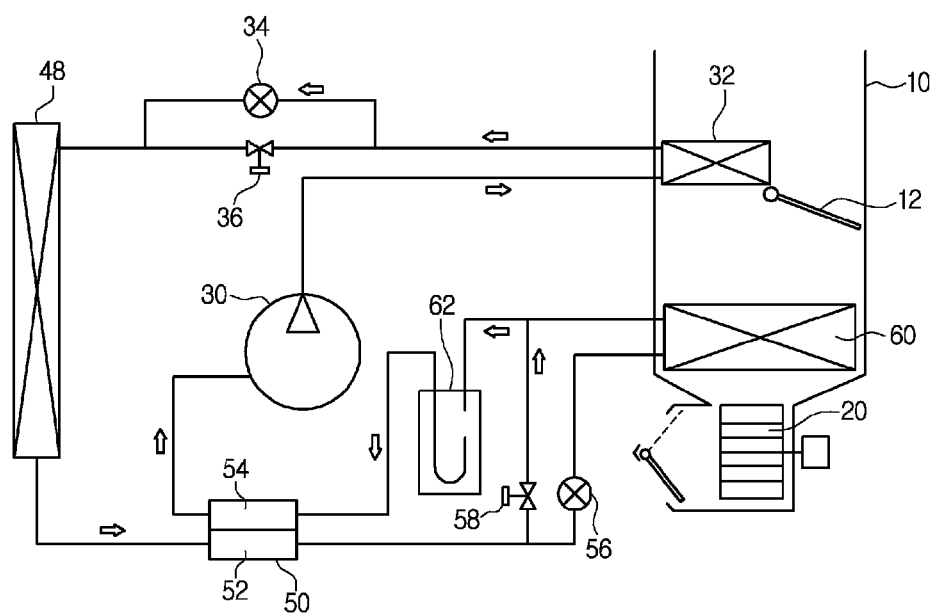
FIG. 1 is a configurative diagram of a heat pump system for a vehicle according to a prior art.

Reference will be now made in detail to the preferred embodiment of the present invention with reference to the attached drawings.

First, a heat pump system for a vehicle according to the present invention is composed of a compressor 100, an interior heat exchanger 110, second expansion means 120, an exterior heat exchanger 130, first expansion means 140, and an evaporator 160 which are connected on a refrigerant circulation line (R) in order, and is preferably applied to electric vehicles or hybrid vehicles.

Moreover, on the refrigerant circulation line (R), a first bypass line (R1) bypassing the first expansion means 140 and the evaporator 160, a second bypass line (R2) bypassing the exterior heat exchanger 130, and an expansion line (R3) on which the second expansion means 120 is mounted are respectively connected in parallel. A first direction changing valve 191 is mounted at a branching point of the first bypass line (R1), a second direction changing valve 192 is mounted at a branching point of the second bypass line (R2), and a third direction changing valve 193 is mounted at a branching point of the expansion line (R3).

Furthermore, a branching line (R4) is mounted for connecting the refrigerant circulation line (R) of an outlet side of the first expansion means 140 and the first bypass line (R1) with each other, and a ON-OFF valve 195 is mounted on the branching line (R4).

Figure 2:
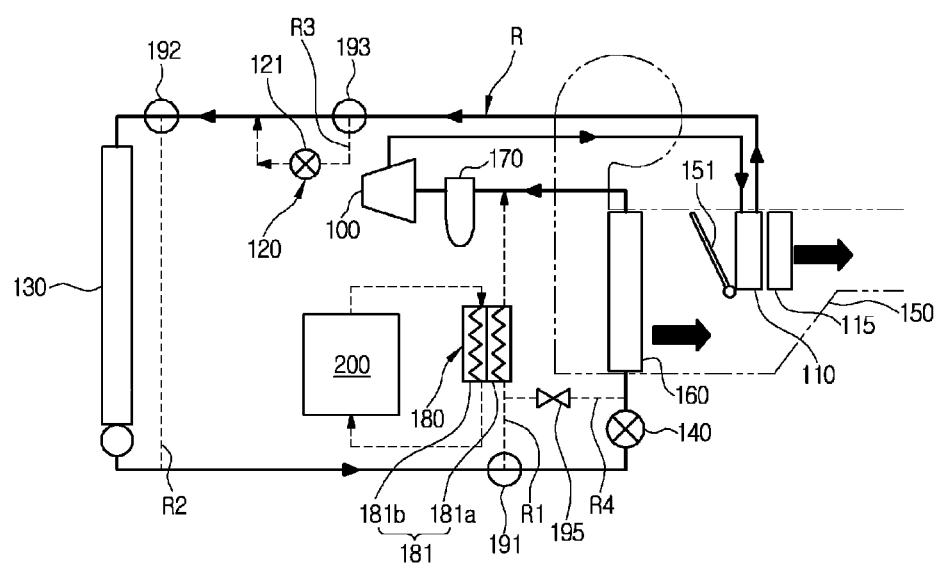
FIG. 2 is a configurative diagram of an air-conditioning mode of a heat pump system for a vehicle according to the present invention.

Therefore, in an air-conditioning mode, as shown in FIG. 2, the refrigerant discharged from the compressor 100 circulates through the interior heat exchanger 110, the exterior heat exchanger 130, the first expansion means 140, the evaporator 160, and the compressor 100 in order, and in this instance, the interior heat exchanger 110 serves as a condenser and the evaporator 160 serves as an evaporator.

Meanwhile, the exterior heat exchanger 130 also serves as a condenser like the interior heat exchanger 110.

Figure 3:
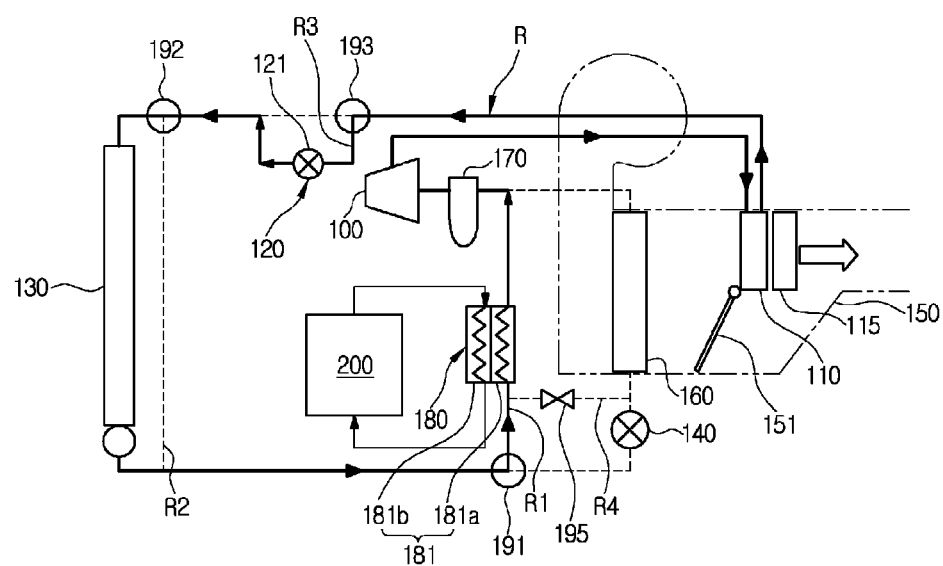
FIG. 3 is a configurative diagram of a first heating mode of a heat pump mode of the heat pump system for the vehicle according to the present invention.

In a heat pump mode (first heating mode), as shown in FIG. 3, the refrigerant discharged from the compressor 100 circulates through the interior heat exchanger 110, the second expansion means 120, the exterior heat exchanger 130, the first bypass line (R1), and the compressor 100 in order, and in this instance, the interior heat exchanger 110 serves as a condenser and the exterior heat exchanger 130 serves as an evaporator. The refrigerant is not supplied to the first expansion means 140 and the evaporator 160.

As described above, the heat pump system according to the present invention can communize the refrigerant circulation line (R) because circulation directions of refrigerant in the air-conditioning mode and the in the heat pump mode are the same, prevent stagnation of refrigerant which is generated when the refrigerant does not flow, and simplify the refrigerant circulation line (R).

In addition, in the present invention, the heat pump mode can be diversified like a first heating mode, a second heating mode, and a dehumidification mode. Furthermore, in such a heat pump mode, when frosting begins on the external heat exchanger 130, the system carries out a defrosting control through a controlling part (not shown), which will be described later.

Moreover, when the outdoor temperature is above the reference temperature, the first heating mode of the heat pump mode is carried out, but when the outdoor temperature is below the reference temperature, the second heating mode of the heat pump mode is carried out.

Here, when the outdoor temperature is above 0° C. (above zero), the first heating mode is carried out, but when the outdoor temperature is below 0° C. (below zero), the second heating mode is carried out.

Of course, the reference temperature of the outdoor temperature to divide the heat pump mode into the first heating mode and the second heating mode is not limited to 0° C., and may be changed according to purposes.

Furthermore, the dehumidification mode is carried out when a user wants to dehumidify the interior of the vehicle in the first and second heating modes.

Hereinafter, components of the heat pump system for the vehicle according to the present invention will be described in detail.

First, the compressor 100 mounted on the refrigerant circulation line (R) inhales and compresses refrigerant while operating by receiving a driving force from a driving source (an internal combustion engine, a motor, or others), and then, discharges the refrigerant in a gas phase of high-temperature and high-pressure.

The compressor 100 inhales and compresses the refrigerant discharged from the evaporator 160 and supplies to the interior heat exchanger 110 in the air-conditioning mode, and inhales and compresses the refrigerant discharged from the exterior heat exchanger 130 and passing through the first bypass line (R1) and supplies to the interior heat exchanger 110 in the heat pump mode.

Additionally, in the dehumidification mode of the heat pump mode, because refrigerant is simultaneously supplied to the first bypass line (R1) and the evaporator 160 through the branching line (R4), the compressor 100 inhales and compresses the refrigerant which is joined after passing through the first bypass line (R1) and the evaporator 160, and then, supplies the compressed refrigerant to the interior heat exchanger 110.

The interior heat exchanger 110 is mounted inside the air-conditioning case 150 and connected with the refrigerant circulation line (R) of the outlet side of the compressor 100 so as to heat-exchange air flowing inside the air-conditioning case 150 with the refrigerant discharged from the compressor 100.

Furthermore, the evaporator 160 is mounted inside the air-conditioning case 150 and connected with the refrigerant circulation line (R) of the inlet side of the compressor 100 so as to heat-exchange the air flowing inside the air-conditioning case 150 with the refrigerant supplied to the compressor 100.

The interior heat exchanger 110 serves as a condenser all in the air-conditioning mode and the heat pump mode.

The evaporator 160 serves as an evaporator in the air-conditioning mode, is stopped in the first and second heating modes of the heat pump mode because refrigerant is not supplied, and serves as the evaporator in the dehumidification mode because some of the refrigerant is supplied.

In this instance, the evaporator 160 in the dehumidification mode becomes less efficient than the evaporator 160 in the air-conditioning mode.

Additionally, the interior heat exchanger 110 and the evaporator 160 are spaced apart from each other at a predetermined interval inside the air-conditioning case 150, and in this instance, the evaporator 160 and the interior heat exchanger 110 are mounted in order from the upstream side of an air flow direction inside the air-conditioning case 150.

Accordingly, in the air-conditioning mode that the evaporator 160 serves as an evaporator, as shown in FIG. 2, the refrigerant of low-temperature and low-pressure discharged from the first expansion means 140 is supplied to the evaporator 160, and in this instance, the air flowing inside the air-conditioning case 150 through the blower (not shown) is converted into cold air by exchanging heat with the refrigerant of low-temperature and low-pressure of the evaporator 160 while passing through the evaporator 160, and then, is discharged to the interior of the vehicle to thereby cool the interior of the vehicle.

In the heat pump mode (first heating mode) that the interior heat exchanger 110 serves as a condenser, as shown in FIG. 3, the refrigerant of high-temperature and high-pressure discharged from the compressor 100 is supplied to the interior heat exchanger 110, and in this instance, the air flowing inside the air-conditioning case 150 through the blower (not shown) is converted into warm air by exchanging heat with the refrigerant of high-temperature and high-pressure of the interior heat exchanger 110 while passing through the interior heat exchanger 110, and then, is discharged to the interior of the vehicle to thereby heat the interior of the vehicle.

In the meantime, it is preferable that the evaporator 160 is larger than the interior heat exchanger 110.

Moreover, a temperature-adjustable door 151 for adjusting an amount of air bypassing the interior heat exchanger 110 and an amount of air passing through the interior heat exchanger 110 is mounted between the evaporator 160 and the interior heat exchanger 110 inside the air-conditioning case 150.

The temperature-adjustable door 151 adjusts the amount of the air bypassing the interior heat exchanger 110 and the amount of the air passing through the interior heat exchanger 110 to thereby properly control temperature of the air discharged from the air-conditioning case 150.

In this instance, in the air-conditioning mode, as shown in FIG. 2, when a front side passage of the interior heat exchanger 110 is completely closed by the temperature-adjustable door 151, because the cold air passing through the evaporator 160 bypasses the interior heat exchanger 110 and is supplied to the interior of the vehicle, the maximum heating is carried out. In the heat pump mode (first heating mode), as shown in FIG. 3, when a passage bypassing the interior heat exchanger 110 is completely closed by the temperature-adjustable door 151, because all of the air is converted into warm air while passing through the interior heat exchanger 110 serving as the condenser and the warm air is supplied to the interior of the vehicle, the maximum heating is carried out.

Furthermore, the exterior heat exchanger 130 is mounted outside the air-conditioning case 150 and connected with the refrigerant circulation line (R) so as to exchange heat between the refrigerant circulating the refrigerant circulation line (R) and the outdoor air.

Here, the exterior heat exchanger 130 is mounted at the front side of an engine room of the vehicle to exchange heat between the refrigerant flowing inside the exterior heat exchanger 130 and the outdoor air.

In the air-conditioning mode, the exterior heat exchanger 130 serves as a condenser like the interior heat exchanger 110, and in this instance, the refrigerant of high-temperature and high-pressure flowing inside the exterior heat exchanger 130 is condensed while heat-exchanging with the outdoor air. In the heat pump mode (first heating mode), the exterior heat exchanger 130 serves as an evaporator differently from the interior heat exchanger 110, and in this instance, refrigerant of low-temperature flowing inside the exterior heat exchanger 130 is evaporated while heat-exchanging with the outdoor air.

Additionally, the first expansion means 140 is mounted on the refrigerant circulation line (R) of the inlet side of the evaporator 160 and expands the refrigerant supplied to the evaporator 160.

In other words, in the air-conditioning mode, the first expansion means 140 expands the refrigerant discharged from the exterior heat exchanger 130 to make it in a liquid phase (wet saturated state) of low-temperature and low-pressure, and then, supplies the expanded refrigerant to the evaporator 160.

It is preferable that the first expansion means 140 has an expansion valve, but may have an orifice.

Moreover, the second expansion means 120 is mounted on the refrigerant circulation line (R) between the interior heat exchanger 110 and the exterior heat exchanger 130 so as to selectively expand the refrigerant supplied to the exterior heat exchanger 130 according to the air-conditioning mode or the heat pump mode.

The second expansion means 120 is mounted on the expansion line (R3) connected in parallel with the refrigerant circulation line (R) between the interior heat exchanger 110 and the exterior heat exchanger 130.

Here, it is preferable that the second expansion means 120 has an orifice 121, but may have an expansion valve.

Furthermore, at the branching point of the expansion line (R3) and the refrigerant circulation line (R), mounted is the third direction changing valve 193 for changing a flow direction of the refrigerant so that the refrigerant passing through the interior heat exchanger 110 passes the second expansion means 120 through the expansion line (R3) or bypasses the second expansion means (120) according to the air-conditioning mode or the heat pump mode.

Therefore, in the air-conditioning mode, the refrigerant discharged from the compressor 100 and passing through the interior heat exchanger 110 bypasses the second expansion means 120 and is supplied to the exterior heat exchanger 130 by the third direction changing valve 193. In the heat pump mode (first heating mode), the refrigerant discharged from the compressor 100 and passing through the interior heat exchanger 110 is expanded while passing through the expansion line (R3) and the second expansion means 120 and is supplied to the exterior heat exchanger 130 by the third direction changing valve 193.

Additionally, the first bypass line (R1) is mounted in such a way as to connect the refrigerant circulation line (R) of the inlet side of the first expansion means 140 and the refrigerant circulation line (R) of the outlet side of the evaporator 160 with each other, so that the refrigerant circulating through the refrigerant circulation line (R) selectively bypasses the first expansion means 140 and the evaporator 160.

As shown in the drawings, the first bypass line (R1) is arranged in parallel with the first expansion means 140 and the evaporator 160. That is, the inlet side of the first bypass line (R1) is connected with the refrigerant circulation line (R) which connects the exterior heat exchanger 130 and the first expansion means 140 with each other, and the outlet side is connected with the refrigerant circulation line (R) which connects the evaporator 160 and the compressor 100 with each other.

As a result, in the air-conditioning mode, the refrigerant passing through the interior heat exchanger 130 flows toward the first expansion means 140 and the evaporator 160, but, in the heat pump mode (first heating mode), the refrigerant passing through the exterior heat exchanger 130 directly flows toward the compressor 100 through the first bypass line (R1) and bypasses the first expansion means 140 and the evaporator 160.

Here, the change in flow direction of the refrigerant according to the air-conditioning mode and the heat pump mode is achieved by the first direction changing valve 191.

The first direction changing valve 191 is mounted at a branching point of the first bypass line (R1) and the refrigerant circulation line (R) so as to change the flow direction of the refrigerant in such a manner that the refrigerant passing through the exterior heat exchanger 130 flows toward the first bypass line (R1) or the first expansion means 140 according to the air-conditioning mode or the heat pump mode.

In this instance, in the air-conditioning mode, the first direction changing valve 191 changes the flow direction of the refrigerant in such a manner that the refrigerant discharged from the compressor 100 and passing through the interior heat exchanger 110 and the exterior heat exchanger 130 flows toward the first expansion means 140 and the evaporator 160, and in the heat pump mode (first heating mode), the first direction changing valve 191 changes the flow direction of the refrigerant in such a manner that the refrigerant discharged from the compressor 100 and passing through the interior heat exchanger 110, the second expansion means 120 and the exterior heat exchanger 130 flows toward the first bypass line (R1).

In the meantime, it is preferable that the first direction changing valve 191 is mounted at the branching point of the inlet side of the first bypass line (R1) and uses a three-way valve.

Besides the first direction changing valve 191, preferably, the second direction changing valve 192 and the third direction changing valve 193 use the three-way valves.

In addition, the second bypass line (R2) is mounted in parallel on the refrigerant circulation line (R) in such a manner that the refrigerant selectively passing the second expansion means 120 bypasses the exterior heat exchanger 130. In other words, the second bypass line (R2) is mounted to connect the refrigerant circulation lines (R) of the inlet and outlet sides of the exterior heat exchanger 130 so that the refrigerant circulating through the refrigerant circulation line (R) bypasses the exterior heat exchanger 130.

Moreover, at the branching point of the second bypass line (R2) and the refrigerant circulation line (R), mounted is the second direction changing valve 192 for converting the flow direction of the refrigerant in such a manner that the refrigerant flows toward the exterior heat exchanger 130 or the second bypass line (R2) according to the outdoor temperature.

In this instance, when the outdoor temperature is above zero, the refrigerant is controlled by the second direction changing valve 192 to flow toward the exterior heat exchanger 130, but when the outdoor temperature is below zero, the refrigerant is controlled by the second direction changing valve 192 to bypass the exterior heat exchanger 130 and flow toward the second bypass line (R2).

Figure 5:
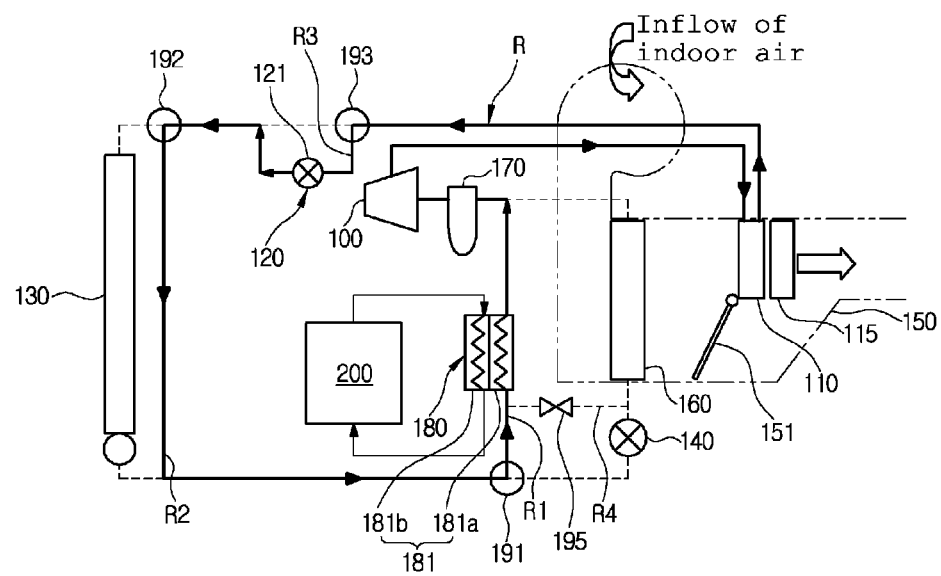
FIG. 5 is a configurative diagram of a second heating mode of a heat pump mode of the heat pump system for the vehicle according to the present invention.

In other words, in a low-temperature heat source condition that the outdoor temperature is below zero, in order to minimize an influence of the outdoor air of low temperature, as shown in FIG. 5 illustrating the second heating mode, the refrigerant passing the second expansion means 120 bypasses the exterior heat exchanger 130 and flows toward the second bypass line (R2).

Moreover, an electric heater 115 for enhancing a heating efficiency is further mounted at the downstream side of the interior heat exchanger 110 inside the air-conditioning case 150.

That is, the electric heater 115 is operated as an auxiliary heat source at the initial stage of start of the vehicle to thereby enhance the heating performance, and the electric heater 115 may be operated even in the case that the system is short of the heat source.

It is preferable that the electric heater 115 is a PTC heater.

Furthermore, heat supplying means 180 for supplying heat to the refrigerant flowing along the first bypass line (R1) is mounted on the first bypass line (R1).

In order to supply waste heat of electronic units 200 of the vehicle to the refrigerant flowing through the first bypass line (R1), the heat supplying means 180 includes a water cooling type heat exchanger 181, and the water cooling type heat exchanger 181 includes: a refrigerant heat-exchanging part 181a in which the refrigerant flowing through the first bypass line (R1) flows; and a cooling water heat-exchanging part 181b in which cooling water circulating through the electronic units 200 of the vehicle flows and which is disposed at one side of the refrigerant heat-exchanging part 181a in such a way as to heat-exchange.

Therefore, in the heat pump mode, the heat pump system according to the present invention can enhance the heating performance by recovering the heat source from the waste heat of the electronic units 200 of the vehicle.

Meanwhile, the electronic units 200 of the vehicle representatively are a motor, an inverter, and so on.

Moreover, in order to supply some of the refrigerant flowing toward the heat supplying means 180 along the first bypass line (R1) to the evaporator 160, a ranching line (R4) for connecting the first bypass line (R1) of the inlet side of the heat supplying means 180 and the refrigerant circulation line (R) of the inlet side of the evaporator 160 with each other is mounted, and the ON-OFF valve 195 for controlling the flow of the refrigerant is mounted on the branching line (R4).

In the dehumidification mode, the ON-OFF valve 195 is opened, so that some of the refrigerant flowing toward the first bypass line (R1) recovers the waste heat of the electronic units 200 of the vehicle while passing through the water cooling type heat exchanger 181 by the first direction changing valve 191 and the remainder is dehumidified while passing the evaporator 160 through the branching line (R4).

So, the air flowing inside the air-conditioning case 150 is dehumidified while passing through the evaporator 160, and in other words, some of the refrigerant is supplied to the evaporator 160 through the branching line (R4) even in the heat pump mode like the first and second heating modes to thereby carry out dehumidification of the interior of the vehicle.

In the meantime, in the second heating mode and in the dehumidification mode of the second heating mode which is operated under the condition that the outdoor temperature is below zero, in order to enhance the heating performance by recovering the heat source of the indoor air, it is preferable to convert an air inflow mode of the air-conditioning case 150 into an indoor air inflow mode to thereby introduce the indoor air into the air-conditioning case 150.

Furthermore, the accumulator 170 is mounted on the refrigerant circulation line (R) of the inlet side of the compressor 100.

The accumulator 170 divides the refrigerant to be supplied to the compressor 100 into the liquid-phase refrigerant and the gas-phase refrigerant and supplies only the gas-phase refrigerant to the compressor 100.

Additionally, a controlling part 300 is disposed to control the heat pump system according to the present invention. In the heat pump mode, if a difference value ($\Delta T$) between outdoor temperature and refrigerant temperature of an outlet side of the exterior heat exchanger 130 is above a frosting decision temperature, the controlling part determines that frosting begins on an exterior heat exchanger 130 and carries out a defrosting control.

Moreover, the controlling part may determines that frosting begins on the exterior heat exchanger 130 if the difference value ($\Delta T$) is above the frosting decision temperature, but may carry out one of the following four embodiments in order to determine frosting more accurately.

In a first embodiment of determination of frosting, in the heat pump mode, if the difference value ($\Delta T$) between outdoor temperature and refrigerant temperature of the outlet side of the exterior heat exchanger 130 is above the frosting decision temperature, the controlling part additionally determines the waste heat of the electronic units 200 supplied through the heat supplying means 180, and then, determines that frosting starts on the exterior heat exchanger 130 and carries out a defrosting control of the heat pump system if the waste heat of the electronic units 200 is less than a reference value.

In this instance, if the difference value ($\Delta T$) between outdoor temperature and refrigerant temperature of the outlet side of the exterior heat exchanger 130 is above 10° C. and if the waste heat of the electronic units 200, namely, temperature of cooling water circulating through the electronic units 200 is less than the reference value, the controlling part determines that frosting starts on the exterior heat exchanger 130.

In other words, in the heat pump mode, if the surface temperature of the exterior heat exchanger 130 serving as the evaporator drops below the freezing point, frosting starts on the surface of the exterior heat exchanger 130, and in this instance, the controlling part recognizes that frosting is formed on the exterior heat exchanger 130 in the state where the difference value ($\Delta T$) between outdoor temperature and refrigerant temperature of the outlet side of the exterior heat exchanger 130 is above 10° C.

Moreover, frosting may be determined based on the waste heat of the electronic units 200, that is, frosting may be determined based on that temperature of cooling water circulating through the electronic units 200 is less than the reference value or that there is little waste heat of the electronic units 200 in a vehicle idling condition. In other words, when the waste heat of the electronic units 200 is stopped or when there is little waste heat of the electronic units 200 like in the vehicle idling condition, frosting can be determined based on the above.

In this instance, the controlling part can check whether or not the waste heat of the electronic units 200 is stopped through temperature of the cooling water circulating through the electronic units 200.

Figure 7:
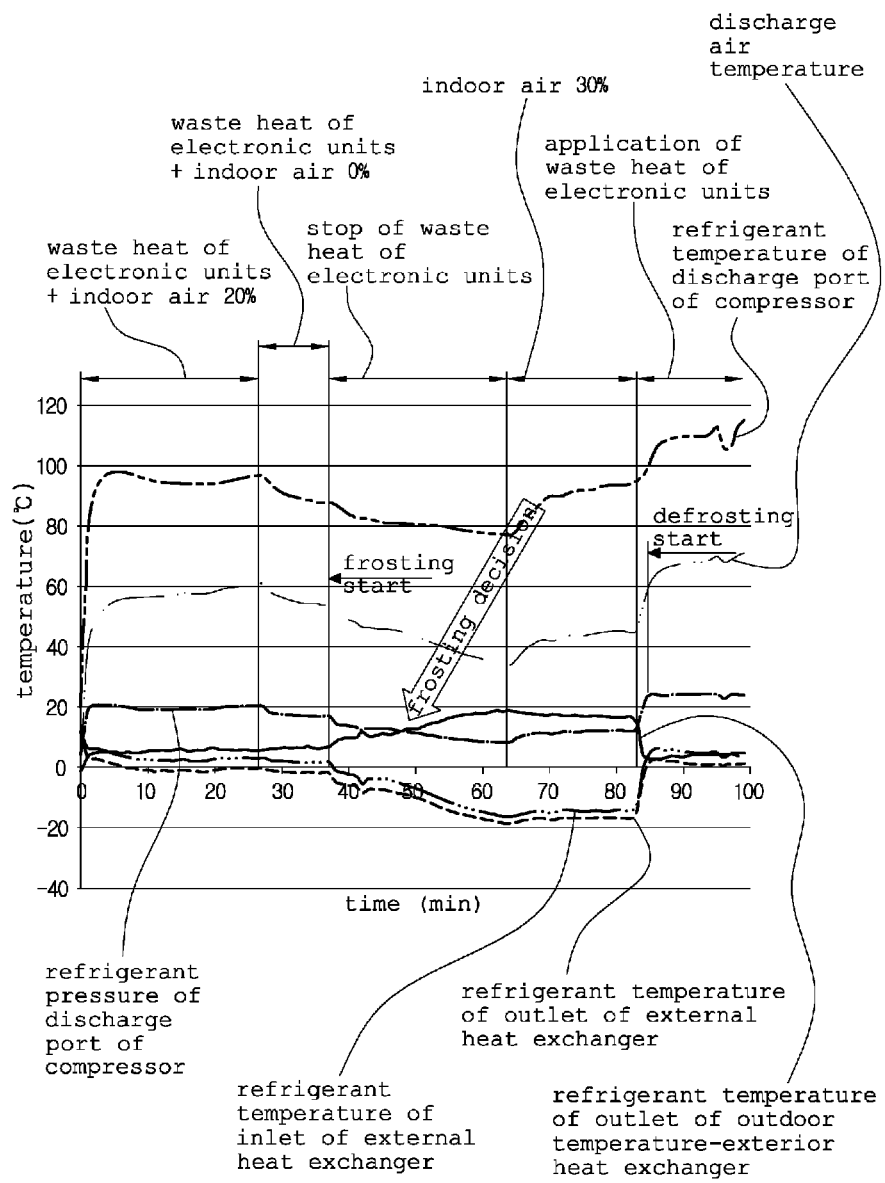
FIG. 7 is a graph showing refrigerant temperature of inlet and outlet sides of an external heat exchanger, refrigerant pressure and temperature of a discharge port of a compressor, refrigerant temperature of an outlet side of an outdoor temperature-exterior heat exchanger, and discharge air temperature of the interior of the vehicle when the outdoor temperature is 0° C.

FIG. 7 is a graph showing refrigerant temperature of inlet and outlet sides of an external heat exchanger, refrigerant pressure and temperature of a discharge port of a compressor, refrigerant temperature of an outlet side of an outdoor temperature-exterior heat exchanger, and discharge air temperature of the interior of the vehicle when the outdoor temperature is 0° C.

As shown in the drawing, in the case that the waste heat of the electronic units and 20% of the indoor air are supplied as the heat source of the system, because the heat source is sufficiently supplied to the system, frosting is not formed on the external heat exchanger 130.

In the case of the waste heat of the electronic units and 0% of the indoor air, even though the indoor air is 0%, because the waste heat of the electronic units is supplied, frosting is not formed on the external heat exchanger 130. Of course, in this case, refrigerant pressure and temperature of the outlet side of the discharge port of the compressor 100 are less in heating performance of the system than the case that 20% of the indoor air is supplied.

Continuously, when the waste heat of the electronic units is stopped, refrigerant pressure and temperature of the outlet side of the discharge port of the compressor 100 are reduced further and the difference value ($\Delta T$) between outdoor temperature and refrigerant temperature of the outlet side of the exterior heat exchanger 130 increases gradually, so that frosting begins on the surface of the exterior heat exchanger 130.

In this instance, if additional heat source is not supplied to the system after frosting is formed on the surface of the external heat exchanger 130, in other words, if the defrosting control is not carried out, frosting continuously expands and the external heat exchanger 130 cannot absorb heat, and hence, the refrigerant temperature and pressure of the system lower and hence, temperature of the air discharged to the interior of the vehicle, so that heating performance is deteriorated and the system becomes instable due to introduction of liquid refrigerant into the compressor 100.

Continuously, referring to FIG. 7, when the difference value ($\Delta T$) between outdoor temperature and refrigerant temperature of the outlet side of the exterior heat exchanger 130 is above 10° C. after the waste heat of the electronic units is stopped and frosting begins on the surface of the external heat exchanger 130, the controlling part determines that frosting is formed on the external heat exchanger 130 and controls the heat pump system to defrost.

In FIG. 7, after frosting begins on the surface of the external heat exchanger 130, the controlling part recognizes the frosting and supplies 30% of the indoor air in order to defrost the heat pump system, so that refrigerant pressure and temperature of the discharge port of the compressor 100 are increased and the heating performance is enhanced. However, because the difference value ($\Delta T$) between outdoor temperature and refrigerant temperature of the outlet side of the exterior heat exchanger 130 is still above 10° C., the controlling part applies the waste heat of the electronic units to carry out the defrosting control.

When the waste heat of the electronic units to carry out the defrosting control, the refrigerant pressure and temperature of the discharge port of the compressor 100 rise sharply, and hence, temperature of the refrigerant introduced into the external heat exchanger 130 also increases to thereby start defrosting of the external heat exchanger 130. In this instance, the difference value ($\Delta T$) between outdoor temperature and refrigerant temperature of the outlet side of the exterior heat exchanger 130 is gradually decreased to thereby drop below 10° C.

As described above, when the controlling part recognizes that frosting begins on the external heat exchanger 130, the controlling part increases the refrigerant pressure and temperature of the heat pump system through the defrosting control, and hence, the heating performance and stability of the heat pump system are enhanced.

In the meantime, in the defrosting control method through the controlling part, besides the method of applying the waste heat of the electronic units, the controlling part can increase the refrigerant pressure and temperature of the system by controlling to decrease the number of revolutions (RPM) of the compressor 100 of the heat pump system so as to reduce a refrigerant flow rate of the system, or can increase the refrigerant temperature of the system by controlling to supply the indoor air and increase an air volume through the indoor air introduction mode of the air-conditioning case 150.

Of course, besides the defrosting control method, various methods to increase the refrigerant pressure and temperature of the heat pump system may be used.

Furthermore, if there is insufficient heat source to control defrosting, the controlling part can increase capacity of the electric heater 115.

In a second embodiment of frosting decision, in the heat pump mode, if the difference value ($\Delta T$) between outdoor temperature and refrigerant temperature of the outlet side of the exterior heat exchanger 130 is above the frosting decision temperature, the controlling part additionally determines the refrigerant pressure of the inlet side of the external heat exchanger 130, and if the refrigerant pressure is less than the reference value, the controlling part determines that frosting is formed on the external heat exchanger 1330 and controls the system to defrost (defrosting mode).

In this instance, if the difference value (ΔT) between outdoor temperature and refrigerant temperature of the outlet side of the exterior heat exchanger 130 is above 10° C. and the refrigerant pressure of the inlet side of the external heat exchanger 130 is less than the reference value, the controlling part determines that frosting is formed on the external heat exchanger 130.

In other words, when the difference value (ΔT) between outdoor temperature and refrigerant temperature of the outlet side of the exterior heat exchanger 130 is above 10° C., the controlling part recognizes that frosting begins on the external heat exchanger 130.

Moreover, it may be determined that frosting begins when the refrigerant pressure of the inlet side of the external heat exchanger 130 is less than the reference value. FIG. 7 does not illustrate the refrigerant pressure of the inlet side of the external heat exchanger 130, but because refrigerant pressure and refrigerant temperature are closely related to each other, the refrigerant pressure may be estimated in reference to the refrigerant temperature of the inlet side of the external heat exchanger 130 illustrated in FIG. 7.

Of course, the controlling part may check not the refrigerant pressure but the refrigerant temperature of the inlet side of the external heat exchanger 130 and determine frosting when the refrigerant temperature is less than the reference value.

Meanwhile, in the second embodiment of frosting decision, frosting decision conditions are different from the first embodiment of frosting decision, but the defrosting control after the frosting decision is carried out in the same way as the first embodiment.

In a third embodiment of frosting decision, in the heat pump mode, if the difference value (ΔT) between outdoor temperature and refrigerant temperature of the outlet side of the exterior heat exchanger 130 is above the frosting decision temperature and if a decrease range of discharge air temperature of the interior of the vehicle is above the reference value when the controlling part additionally determines the decrease range, the controlling part determines that frosting is formed on the external heat exchanger 130 and carry out the defrosting control (defrosting mode) of the heat pump system.

In this instance, if the difference value (ΔT) between outdoor temperature and refrigerant temperature of the outlet side of the exterior heat exchanger 130 is above 10° C. and the decrease range of the discharge air temperature of the interior of the vehicle is above 3° C. (but, when RPMs of the blower of the air-conditioning case 150 and the compressor 100 are uniform), the controlling part determines that frosting is formed on the external heat exchanger 130.

In other words, the controlling part recognizes that frosting begins on the external heat exchanger 130 when the difference value (ΔT) between outdoor temperature and refrigerant temperature of the outlet side of the exterior heat exchanger 130 is above 10° C.

Furthermore, in the case that RPMs of the blower of the air-conditioning case 150 and the compressor 100 are uniform, if the decrease range of the discharge air temperature of the interior of the vehicle is above 3° C., based on the above, frosting is determined. That is, when frosting begins on the external heat exchanger 130, the discharge air temperature of the interior of the vehicle is decreased, and if the decrease range is above 3° C., it may cause consumers' dissatisfaction, and hence, it may be determined as frosting.

Generally, people may feel a change in temperature when a temperature change range is above 3° C.

Additionally, in order to supply the air discharged from the air-conditioning case 150 to the interior of the vehicle, a temperature sensor (not shown) is mounted on a discharge port formed inside the vehicle to sense temperature of the discharge air to the interior of the vehicle.

In the meantime, in the third embodiment of frosting decision, frosting decision conditions are different from the first embodiment of frosting decision, but the defrosting control after the frosting decision is carried out in the same way as the first embodiment.

In a fourth embodiment of frosting decision, in the heat pump mode, if the difference value (ΔT) between outdoor temperature and refrigerant temperature of the outlet side of the exterior heat exchanger 130 is above the frosting decision temperature, the controlling part determines that frosting is formed on the external heat exchanger 130 and carries out the defrosting control of the heat pump system.

In this instance, the controlling part variably sets the frosting decision temperature by outdoor temperature and determines frosting of the external heat exchanger 130.

Based on that the frosting decision temperature is 10° C. when the outdoor temperature is 0° C., the controlling part sets the system to increase the frosting decision temperature more as the outdoor temperature becomes lower when the outdoor temperature is below 0° C. and to increase the frosting decision temperature more as the outdoor temperature becomes higher when the outdoor temperature is above 0° C. and below 10° C.

Figure 8:
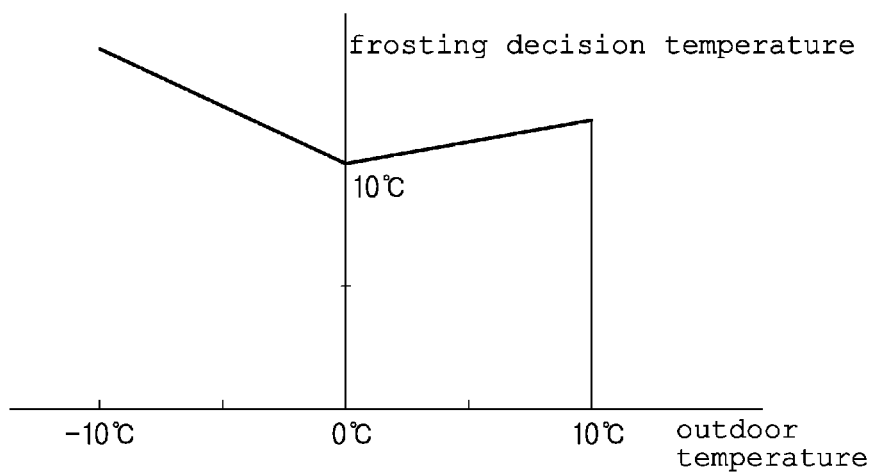
FIG. 8 is a graph showing the case that frosting decision temperature is variably set by outdoor temperature in the heat pump system for the vehicle according to the present invention.

In other words, as shown in FIG. 8, based on that the frosting decision temperature is 10° C. when the outdoor temperature is 0° C., because an amount of vapor decreases when the outdoor temperature is below 0° C., the controlling part sets the system to increase the frosting decision temperature as the outdoor temperature becomes lower. Moreover, the controlling part sets the system to increase the frosting decision temperature to satisfy a frosting condition (refrigerant temperature of the outlet of the exterior heat exchanger ≤0° C.) as the outdoor temperature becomes higher when the outdoor temperature is above ° C. and below 10° C.

As an example, if the outdoor temperature is 0° C. and the difference value (ΔT) (refrigerant temperature of the outlet of the outdoor temperature-external heat exchanger) is 10° C., the refrigerant temperature of the outlet of the external heat exchanger 130 is −10° C. Because it satisfies the frosting condition (refrigerant temperature of the outlet of the exterior heat exchanger ≤0° C.), frosting is formed on the external heat exchanger 130, and hence, the controlling part can determine that frosting is formed on the external heat exchanger 130 if the frosting decision temperature is set to 10° C. when the outdoor temperature is 0° C.

Moreover, if the outdoor temperature is 10° C. and the difference value (ΔT) (refrigerant temperature of the outlet of the outdoor temperature-external heat exchanger) is 10° C., the refrigerant temperature of the outlet of the external heat exchanger 130 is 0° C. In this instance, because frosting is formed when the refrigerant temperature of the outlet of the external heat exchanger 130 is below 0° C., if the frosting decision temperature is still set to 10° C., which is the frosting decision temperature when the outdoor temperature is 0° C., even though the outdoor temperature is 10° C., accuracy in frosting decision is deteriorated.

Therefore, the heat pump system must be set to increase the frosting decision temperature as the outdoor temperature becomes higher. Here, when the frosting decision temperature increases, the refrigerant temperature of the outlet of the external heat exchanger 130 becomes below 0° C.

As described above, based on that the frosting decision temperature is 10° C. when the outdoor temperature is 0° C., because the frosting decision temperature is variably set according to an increase of the outdoor temperature, a highly accurate frosting decision can be obtained.

In the meantime, in the fourth embodiment of frosting decision, frosting decision conditions are different from the first embodiment of frosting decision, but the defrosting control after the frosting decision is carried out in the same way as the first embodiment.

Hereinafter, referring to FIGS. 9 to 12, a method of controlling the heat pump system for the vehicle according to the present invention will be described.

Figure 9:
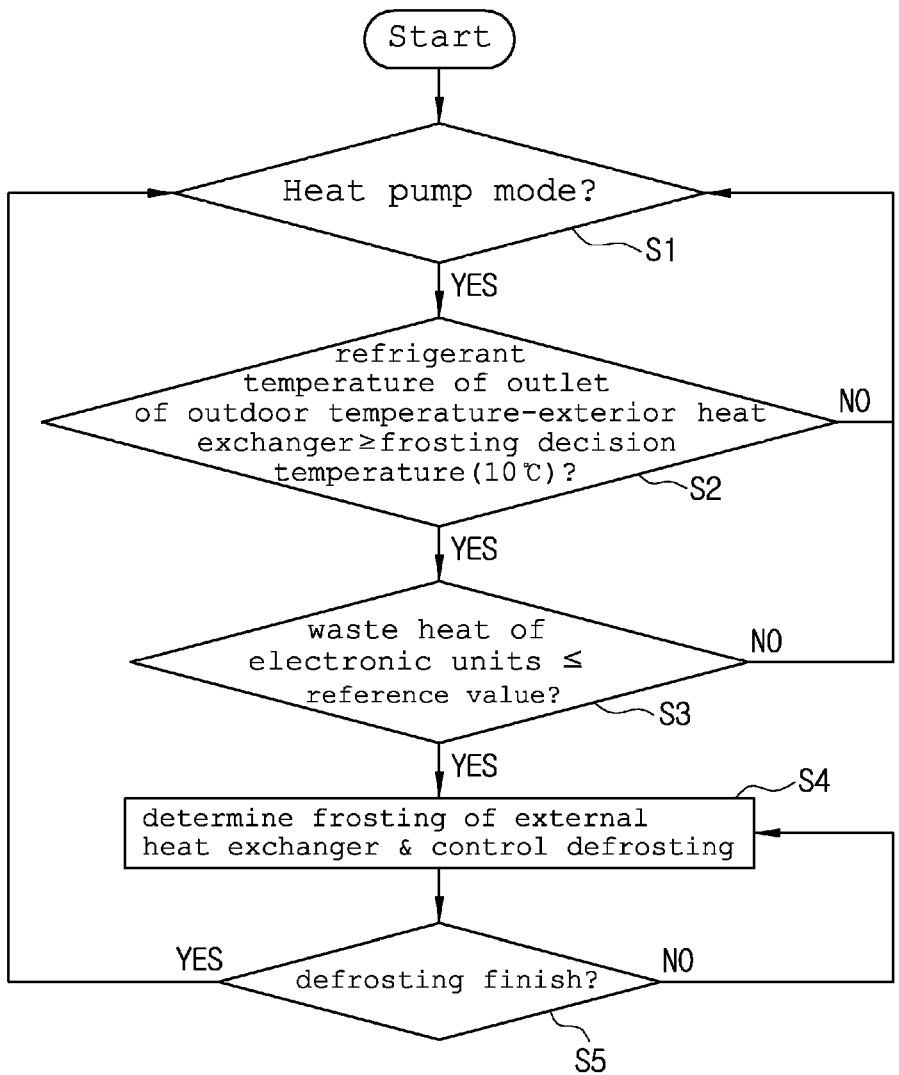
FIGS. 9 to 12 are flow charts showing various preferred embodiments of a method of controlling the heat pump system for the vehicle according to the present invention.
Figure 10:
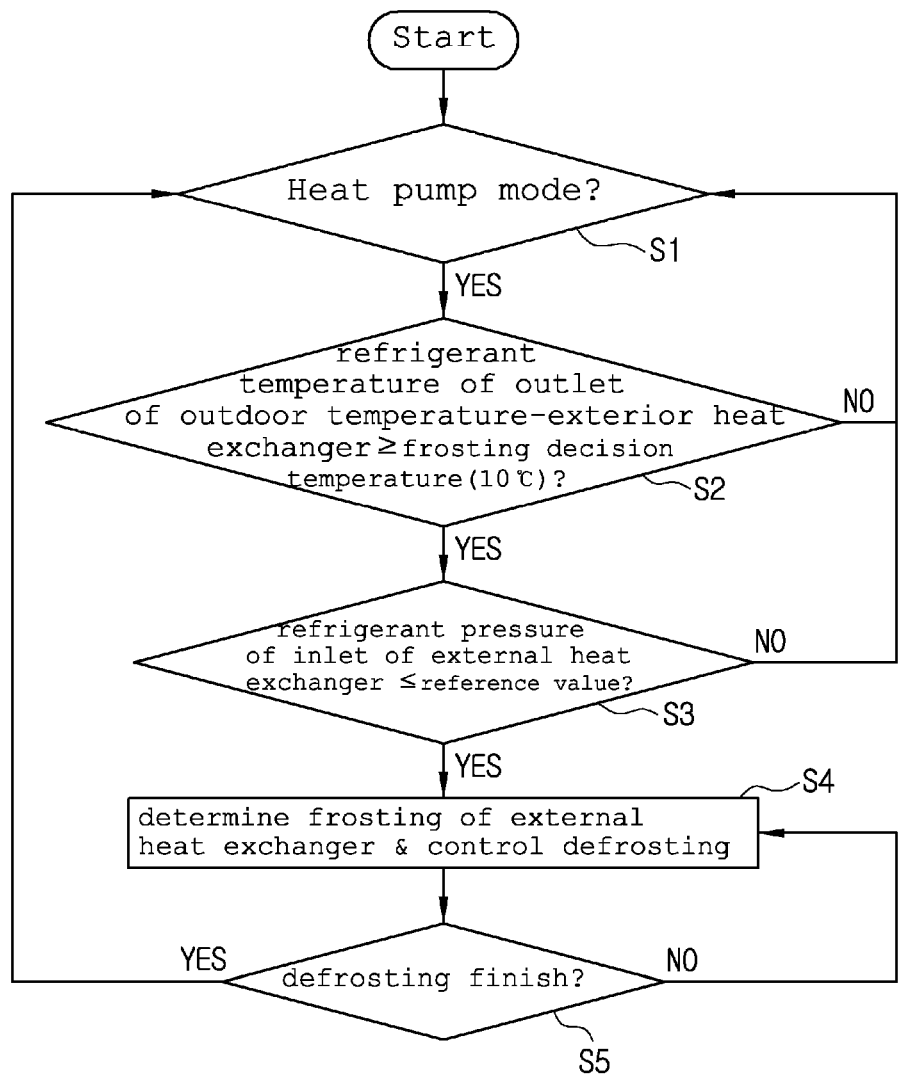
Figure 11:
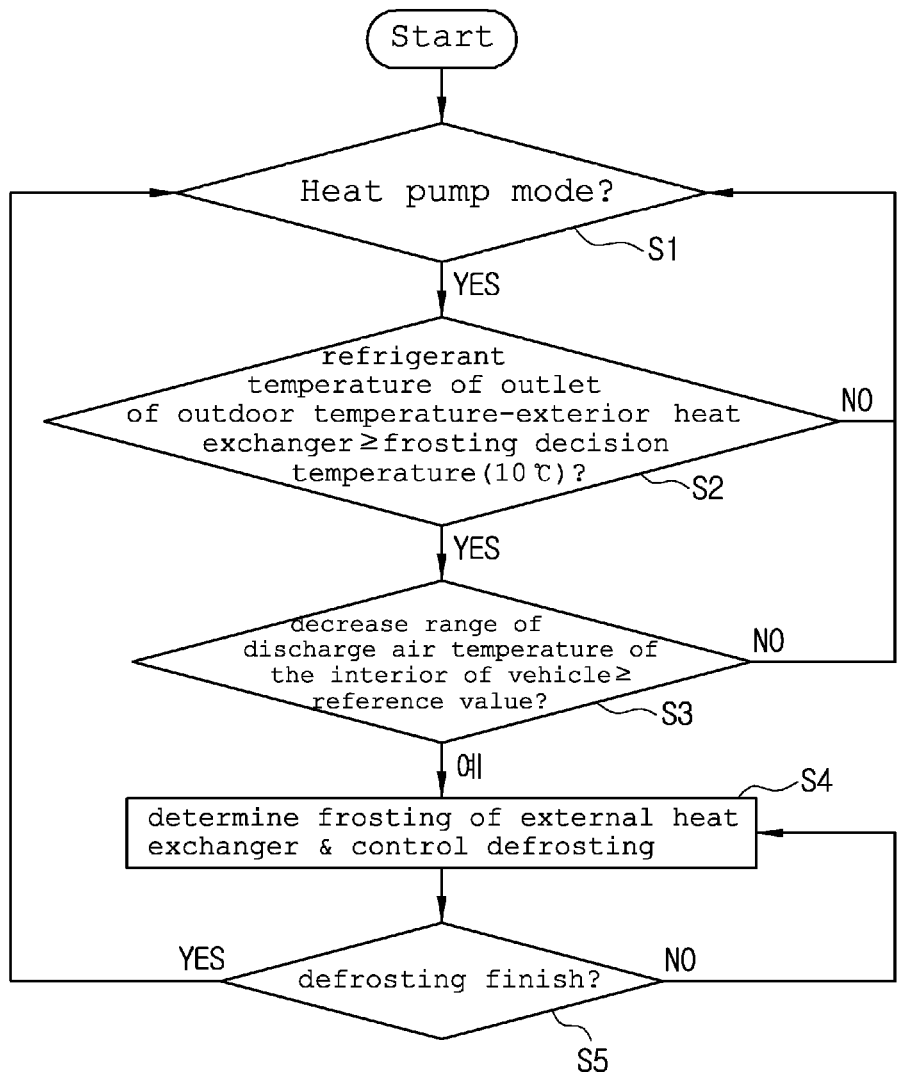
Figure 12:
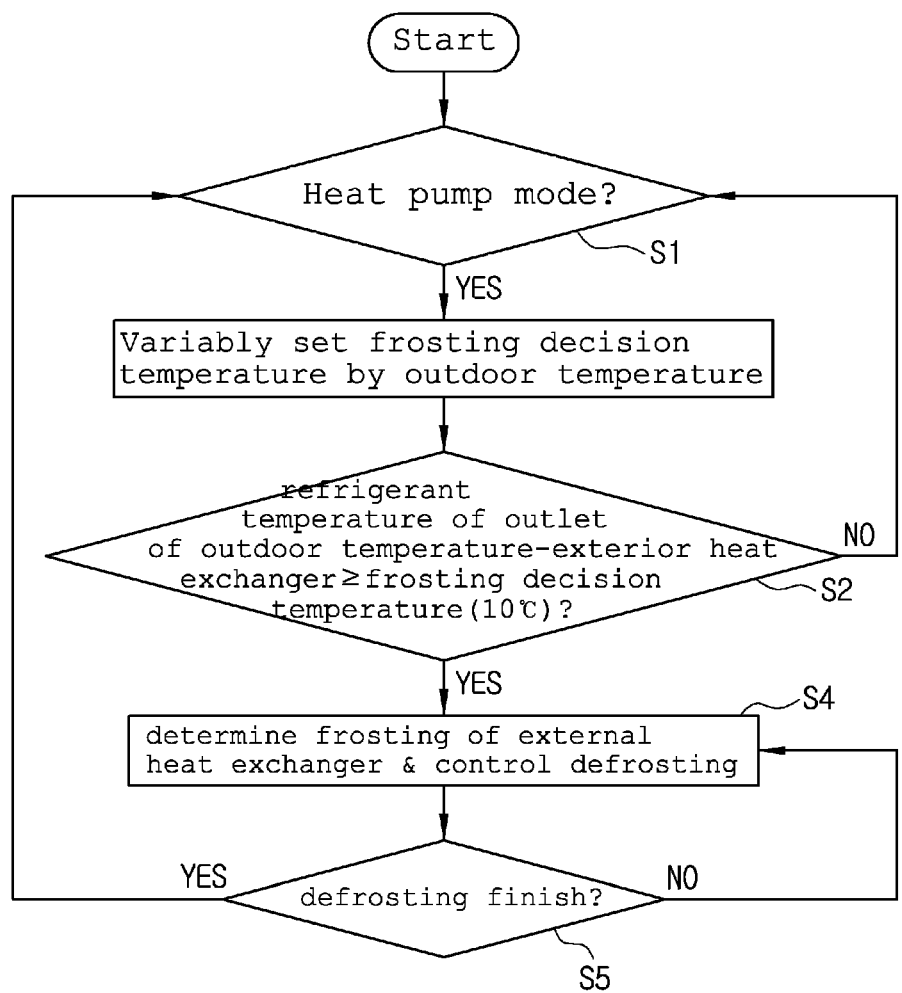

FIG. 9 illustrates a controlling method of the first embodiment of frosting decision, FIG. 10 illustrates a controlling method of the second embodiment of frosting decision, FIG. 11 is a controlling method of the third embodiment of frosting decision, and FIG. 12 illustrates a controlling method of the fourth embodiment of frosting decision.

Referring to FIGS. 9 to 12, in the first to fourth embodiments, detailed conditions for determining frosting of the external heat exchanger 130 are different but most of them are common, and hence, the controlling methods of the embodiments are not described separately but described together.

First, the heat pump system carries out a step (S1) of determining whether or not the heat pump system is in the heat pump mode.

Here, the heat pump mode includes a first heating mode, and a dehumidification mode of the first heating mode as the heating mode that the external heat exchanger 130 serves as an evaporator.

As the determination result of the step (S1), when the heat pump system is in the heat pump mode, the heat pump system carries out a step (S2) of determining whether or not the difference value (ΔT) between outdoor temperature and refrigerant temperature of the outlet side of the exterior heat exchanger 130 is above the frosting decision temperature.

That is, the step (S2) is to determine whether or not the difference value (ΔT) between outdoor temperature and refrigerant temperature of the outlet side of the exterior heat exchanger 130 is above 10° C.

In other words, when the surface temperature of the external heat exchanger 130 serving as the evaporator drops below the freezing point in the heat pump mode, frosting begins on the surface of the external heat exchanger 130, and in this instance, it is determined that frosting is formed on the external heat exchanger 130 when the difference value (ΔT) between outdoor temperature and refrigerant temperature of the outlet side of the exterior heat exchanger 130 is above 10° C.

In the step (S2), if the difference value (ΔT) between outdoor temperature and refrigerant temperature of the outlet side of the exterior heat exchanger 130 is not above 10° C., the process is returned to the step (S1) of determining whether or not the heat pump system is in the heat pump mode.

Continuously, as the determination result of the step (S2) of determining whether or not the difference value (ΔT) between outdoor temperature and refrigerant temperature of the outlet side of the exterior heat exchanger 130 is above the frosting decision temperature, if the difference value (ΔT) is above the frosting decision temperature, namely, above 10° C., the heat pump system may determine that frosting is formed on the external heat exchanger 130 and carry out a step (S4) of controlling the heat pump system to defrost, but may carry out a step (S3) of determining additional conditions according to the first to third embodiments of frosting decision in order to carry out frosting decision with a higher accuracy.

In more detail, in the first embodiment of frosting decision, as shown in FIG. 9, if the difference value (ΔT) between outdoor temperature and refrigerant temperature of the outlet side of the exterior heat exchanger 130 is above 10° C., the heat pump system further carries out the step (S3) of additionally determining the waste heat of the electronic units 200 of the vehicle if the difference value (ΔT) between outdoor temperature and refrigerant temperature of the outlet side of the exterior heat exchanger 130 is above 10° C., and as the determination result, if the waste heat of the electronic units 200 is below the reference value, the heat pump system determines that frosting is formed on the external heat exchanger 130.

In other words, in the case that temperature of cooling water circulating through the electronic units 200, which is the waste heat of the electronic units 200, is below the reference value or in the idling state of the vehicle, because there is little waste heat of the electronic units 200, the system may determine frosting based on the above. That is, in the case that the waste heat of the electronic units 200 is stopped or in the case that there is little waste heat of the electronic units 200 like the idling state of the vehicle, the system can determine frosting based on the above.

If the waste heat of the electronic units 200 of the vehicle is not below the reference value, the heat pump system returns to the step (S1) of determining whether or not the system is in the heat pump mode.

Continuously, as the determination result of additionally determining the waste heat of the electronic units 200 of the vehicle, if the waste heat of the electronic units 200 of the vehicle is below the reference value, the system determines that frosting is formed on the external heat exchanger 130 and goes to the step (S4) of carrying out the defrosting control of the heat pump system.

In the second embodiment of frosting decision, as shown in FIG. 10, if the difference value (ΔT) between outdoor temperature and refrigerant temperature of the outlet side of the exterior heat exchanger 130 is above 10° C., the heat pump system carries out the step (S3) of additionally determining the refrigerant pressure of the inlet side of the external heat exchanger. As the determination result, if the refrigerant pressure is below the reference value, the system determines that frosting is formed on the external heat exchanger 130.

In other words, in the case that the refrigerant pressure of the inlet side of the external heat exchanger 130 is below the reference value, the system may determine frosting based on the above. FIG. 7 does not illustrate the refrigerant pressure of the inlet side of the external heat exchanger 130, but because refrigerant pressure and refrigerant temperature are closely related to each other, the refrigerant pressure may be estimated in reference to the refrigerant temperature of the inlet side of the external heat exchanger 130 illustrated in FIG. 7.

Of course, the heat pump system may check not the refrigerant pressure but the refrigerant temperature of the inlet side of the external heat exchanger 130, and if the refrigerant temperature is below the reference value, the system may determine frosting based on the above.

If the refrigerant pressure of the inlet side of the external heat exchanger 130 is not below the reference value, the heat pump system returns to the step (S1) of determining whether or not the system is in the heat pump mode.

Continuously, as the determination result of the step (S3) of additionally determining the refrigerant pressure of the inlet side of the external heat exchanger 130, if the refrigerant pressure of the inlet side of the external heat exchanger 130 is below the reference value, the heat pump system determines that frosting is formed on the external heat exchanger 130 and goes to the step (S4) of carrying out the defrosting control of the system.

In the third embodiment of frosting decision, as shown in FIG. 11, if the difference value (ΔT) between outdoor temperature and refrigerant temperature of the outlet side of the exterior heat exchanger 130 is above 10° C., the heat pump system carries out the step (S3) of additionally determining the decrease range of the discharge air temperature of the interior of the vehicle. As the determination result, if the decrease range is above the reference value (3° C.), the system determines that frosting is formed on the external heat exchanger 130.

That is, if the decrease range is above the reference value of 3° C. in a state where RPMs of the blower of the air-conditioning case 150 and the compressor 100 are uniform, the system may determine frosting based on the above. In other words, when frosting begins on the external heat exchanger 130, the discharge air temperature of the interior of the vehicle is decreased. When the decrease range is above 3° C., it may cause the consumers' dissatisfaction, and hence, it may be determined as frosting.

If the decrease range of the discharge air temperature of the interior of the vehicle is not above the reference value of 3° C., the heat pump system returns to the step (S1) of determining whether or not the heat pump system is in the heat pump mode.

Continuously, as the determination result of the step (S3) of additionally determining the decrease range of the discharge air temperature of the interior of the vehicle, if the decrease range of the discharge air temperature of the interior of the vehicle is above the reference value of 3° C., the system determines that frosting is formed on the external heat exchanger 130 and carries out the step (S4) of controlling the heat pump system to defrost.

In the meantime, in the fourth embodiment of frosting decision, as shown in FIG. 12, before the system carries out the step (S2) of determining whether or not the difference value (ΔT) between outdoor temperature and refrigerant temperature of the outlet side of the exterior heat exchanger 130 is above the frosting decision temperature, the system variably sets the frosting decision temperature by outdoor temperature.

In this instance, based on that the frosting decision temperature is 10° C. when the outdoor temperature is 0° C., the controlling part sets the system to increase the frosting decision temperature more as the outdoor temperature becomes lower when the outdoor temperature is below 0° C. and to increase the frosting decision temperature more as the outdoor temperature becomes higher when the outdoor temperature is above 0° C. and below 10° C.

In other words, as shown in FIG. 8, based on that the frosting decision temperature is 10° C. when the outdoor temperature is 0° C., because an amount of vapor decreases when the outdoor temperature is below 0° C., the controlling part sets the system to increase the frosting decision temperature as the outdoor temperature becomes lower. Moreover, the controlling part sets the system to increase the frosting decision temperature to satisfy a frosting condition (refrigerant temperature of the outlet of the exterior heat exchanger ≤0° C.) as the outdoor temperature becomes higher when the outdoor temperature is above ° C. and below 10° C.

In the fourth embodiment of frosting decision, even though the waste heat of the electronic units 200 of the vehicle, the refrigerant pressure of the inlet side of the external heat exchanger 130, or the decrease range of the discharge air temperature of the interior of the vehicle is not additionally determined, when the frosting decision temperature by outdoor temperature is set variably, it can enhance accuracy in frosting decision of the external heat exchanger 130.

Of course, not shown in the drawings, but even in the case of the fourth embodiment of frosting decision, like the first to the third embodiments of frosting decision, the heat pump system can additionally determine the waste heat of the electronic units 200 of the vehicle, the refrigerant pressure of the inlet side of the external heat exchanger 130, or the decrease range of the discharge air temperature of the interior of the vehicle and use the determination result in decision of frosting of the external heat exchanger 130.

In the meantime, in the fourth embodiment of frosting decision, as the determination result of determining the difference value (ΔT) between outdoor temperature and refrigerant temperature of the outlet side of the exterior heat exchanger 130, if the difference value (ΔT) is above the frosting decision temperature, the system determines that frosting is formed on the external heat exchanger 130 and goes to the step (S4) of controlling the heat pump system to defrost.

Continuously, in the first to fourth embodiments of frosting decision, in the step (S4) of controlling the heat pump system to defrost, the system is controlled to increase refrigerant pressure and temperature of the heat pump system.

In order to control defrosting, the heat pump system can be controlled through a proper combination of application of waste heat of the electronic units, supply of indoor air, a control of decrease of RPM of the compressor 100, and besides the above, various methods may be used to increase the refrigerant pressure and temperature of the heat pump system.

Moreover, after the step (S4) of controlling the heat pump system to defrost, the system determines whether or not defrosting of the external heat exchanger 130 is finished, and if it is finished, the system goes to the step (S5) of returning to the step (S1) of determining whether or not the heat pump system is in the heat pump mode.

In the step (S5), if defrosting of the external heat exchanger 130 is not finished, the system returns to the step (S4) of control the heat pump system to defrost.

Hereinafter, the action of the heat pump system for the vehicle according to the present invention will be described.

A. Air-Conditioning Mode (Cooling Mode) (See FIG. 2)

In the air-conditioning mode (cooling mode), as shown in FIG. 2, the first bypass line (R1) is closed by the first direction changing valve 191, the second bypass line (R2) is also closed by the second direction changing valve 192, and the third direction changing valve 193 closes the expansion line (R3).

Moreover, the cooling water circulating through the electronic units 200 is not supplied to the water cooling type heat exchanger 181 of the heat supplying means 180.

Meanwhile, in order to achieve the maximum cooling, the temperature adjustable door 151 inside the air-conditioning case 150 closes the passage passing through the interior heat exchanger 110, so that the air blown into the air-conditioning case 150 by the blower is cooled while passing through the evaporator 160 and is supplied to the interior of the vehicle by bypassing the interior heat exchanger 110 to thereby cool the interior of the vehicle.

Continuously, a refrigerant circulation process will be described.

The gas-phase refrigerant of high-temperature and high-pressure discharged after being compressed in the compressor 100 is supplied to the interior heat exchanger 110 mounted inside the air-conditioning case 150.

As shown in FIG. 2, the refrigerant supplied to the interior heat exchanger 110 directly flows to the exterior heat exchanger 130 without heat-exchanging with the air because the temperature adjustable door 151 closes the passage of the interior heat exchanger 110.

The refrigerant flowing to the exterior heat exchanger 130 is condensed while heat-exchanging with the outdoor air, and thereby, the gas-phase refrigerant is converted into the liquid-phase refrigerant.

In the meantime, all of the interior heat exchanger 110 and the exterior heat exchanger 130 serve as the condensers, but the refrigerant is mainly condensed in the exterior heat exchanger 130 which heat-exchanges with the outdoor air.

Continuously, the refrigerant passing through the exterior heat exchanger 130 is decompressed and expanded while passing through the first expansion means 140 to thereby become a liquid-phase refrigerant of low-temperature and low-pressure, and then, is introduced into the evaporator 160.

The refrigerant introduced into the evaporator 160 is evaporated by heat-exchanging with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is introduced into the compressor 100 and recirculates the above cycle.

B. First Heating Mode of Heat Pump Mode (See FIG. 3)

The first heating mode of the heat pump mode is operated under the condition that the outdoor temperature is above zero, and uses the outdoor air and the waste heat of the electronic units 200 of the vehicle as a heat source. As shown in FIG. 3, the first bypass line (R1) is opened by the first direction changing valve 191, and the refrigerant is not supplied to the first expansion means 140 and the evaporator 160.

Moreover, the second bypass line (R2) is closed by the second direction changing valve 192, and the expansion line (R3) is opened by the third direction changing valve 193.

Meanwhile, the cooling water heated by the electronic units 200 of the vehicle is supplied to the cooling water heat-exchanging part 181b of the water cooling type heat exchanger 181 of the heat supplying means 180.

Furthermore, in the first heating mode, the temperature adjustable door 151 inside the air-conditioning case 150 closes the passage bypassing the interior heat exchanger 110, so that the air blown into the air-conditioning case 150 by the blower is changed into warm air while passing through the interior heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the interior heat exchanger 110 mounted inside the air-conditioning case 150.

The gas-phase refrigerant of high-temperature and high-pressure introduced into the interior heat exchanger 110 is condensed while heat-exchanging with the air blown into the air-conditioning case 150 by the blower, and in this instance, the air passing through the interior heat exchanger 110 is converted into warm air and supplied to the interior of the vehicle to thereby heat the interior of the vehicle.

Continuously the refrigerant discharged from the interior heat exchanger 110 moves to the expansion line (R3) by the third direction changing valve 193, and the refrigerant flowing to the expansion line (R3) is decompressed and expanded while passing through the second expansion means 120 to thereby become a liquid-phase refrigerant of low-temperature and low-pressure, and then, is supplied to the exterior heat exchanger 130 which serves as an evaporator.

The refrigerant supplied to the exterior heat exchanger 130 is evaporated while heat-exchanging with the indoor air and passes the first bypass line (R1) by the first direction changing valve 191. In this instance, the refrigerant passing the first bypass line (R1) heat-exchanges with the cooling water passing through the cooling water heat-exchanging part 181b while passing through the refrigerant heat-exchanging part 181a of the water cooling type heat exchanger 181 so as to recover the waste heat of the electronic units 200 of the vehicle, and then, is introduced into the compressor 100 to recirculate the above cycle.

During the first heating mode, if the difference value (ΔT) between outdoor temperature and refrigerant temperature of the outlet side of the exterior heat exchanger 130 is above the frosting decision temperature, the controlling part determines that frosting is formed on the external heat exchanger 130 and carries out the defrosting mode to control the system to defrost.

In the defrosting mode, one of various controlling methods to increase the refrigerant pressure and temperature of the system, such as, application of the waste heat of the electronic units, supply of indoor air to the air-conditioning case 150, or decrease of RPM of the compressor 100, is carried out.

Figure 4:
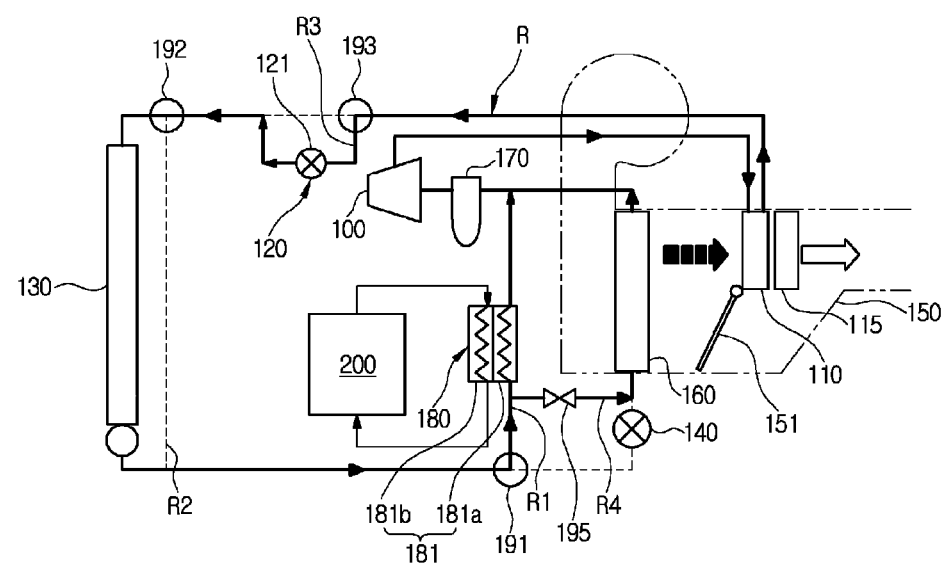
FIG. 4 is a configurative diagram of a dehumidification mode during an operation in the first heating mode of the heat pump mode of the heat pump system.

C. Dehumidification Mode of First Heating Mode of Heat Pump Mode (See FIG. 4)

The dehumidification mode of the first heating mode of the heat pump mode is carried out in the case that dehumidification of the interior is needed during the first heating mode of FIG. 3.

Therefore, only different parts from the first heating mode of FIG. 3 will be described.

In the dehumidification mode, during the first heating mode, the branching line (R4) is additionally opened through the ON-OFF valve 195.

Moreover, in the dehumidification mode, the temperature adjustable door 151 inside the air-conditioning case 150 closes the passage bypassing the interior heat exchanger 110, so that the air blown into the air-conditioning case 150 by the blower is cooled while passing through the evaporator 160, and then, the cool air is converted into warm air while passing through the interior heat exchanger 110 and supplied to the interior of the vehicle to thereby heat the interior of the vehicle.

In this instance, because the amount of refrigerant supplied to the evaporator 160 is small, an air cooling efficiency is low and a change of the indoor temperature is minimized, so that dehumidification of the air passing through the evaporator 160 is carried out smoothly.

Continuously, the refrigerant passing through the compressor 100, the interior heat exchanger 110, the second expansion means 120 and the exterior heat exchanger 130 passes the first bypass line (R1) by the first direction changing valve 191. In this instance, some of the refrigerant passing the first bypass line (R1) heat-exchanges with the cooling water passing through the cooling water heat-exchanging part 181b and is evaporated while recovering the waste heat of the electronic units 200 of the vehicle during the process that the refrigerant passes through the refrigerant heat-exchanging part 181a of the water cooling type heat exchanger 181, and the other of the refrigerant is supplied to the evaporator 160 through the branching line (R4) and is evaporated while heat-exchanging with the air flowing inside the air-conditioning case 150.

In the above process, dehumidification of the air passing through the evaporator 160 is carried out, and the dehumidified air passing through the evaporator 160 is converted into warm air while passing through the interior heat exchanger 110, and then, is supplied to the interior of the vehicle to dehumidify the interior of the vehicle.

After that, the refrigerants respectively passing through the water cooling type heat exchanger 181 and the evaporator 160 are joined together, and then, the joined refrigerant is introduced into the compressor 100, and then, recirculates through the above cycle.

D. Second Heating Mode of Heat Pump Mode (See FIG. 5)

The second heating mode of the heat pump mode is operated under the condition that the outdoor temperature is below zero, and uses the indoor air (indoor air introducing mode) and the waste heat of the electronic units 200 of the vehicle as a heat source. As shown in FIG. 5, the first bypass line (R1) is opened by the first direction changing valve 191, and the second bypass line (R2) is opened by the second direction changing valve 192.

Moreover, the branching line (R4) is closed by the ON-OFF valve 195, the expansion line (R3) is opened by the third direction changing valve 193, and the mode is converted into the indoor air introducing mode to introduce the indoor air into the air-conditioning case 150.

Meanwhile, the cooling water heated by the electronic units 200 of the vehicle is supplied to the cooling water heat-exchanging part 181b of the water cooling type heat exchanger 181 of the heat supplying means 180.

Furthermore, in the second heating mode, the temperature adjustable door 151 inside the air-conditioning case 150 closes the passage bypassing the interior heat exchanger 110, so that the air blown into the air-conditioning case 150 by the blower is changed into warm air while passing through the interior heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the interior heat exchanger 110 mounted inside the air-conditioning case 150.

The gas-phase refrigerant of high-temperature and high-pressure introduced into the interior heat exchanger 110 is condensed while heat-exchanging with the air blown into the air-conditioning case 150 by the blower, and in this instance, the air passing through the interior heat exchanger 110 is converted into warm air and supplied to the interior of the vehicle to thereby heat the interior of the vehicle.

Continuously the refrigerant discharged from the interior heat exchanger 110 moves to the expansion line (R3) by the third direction changing valve 193, and the refrigerant flowing to the expansion line (R3) is decompressed and expanded while passing through the second expansion means 120 to thereby become a liquid-phase refrigerant of low-temperature and low-pressure. After that, the refrigerant flows to the second bypass line (R2) and bypasses the exterior heat exchanger 130.

After that, the refrigerant passing through the second bypass line (R2) passes the first bypass line (R1) by the first direction changing valve 191. In this instance, the refrigerant passing the first bypass line (R1) heat-exchanges with the cooling water passing through the cooling water heat-exchanging part 181b while passing through the refrigerant heat-exchanging part 181a of the water cooling type heat exchanger 181 so as to recover the waste heat of the electronic units 200 of the vehicle, and then, is introduced into the compressor 100 to recirculate the above cycle.

Figure 6:
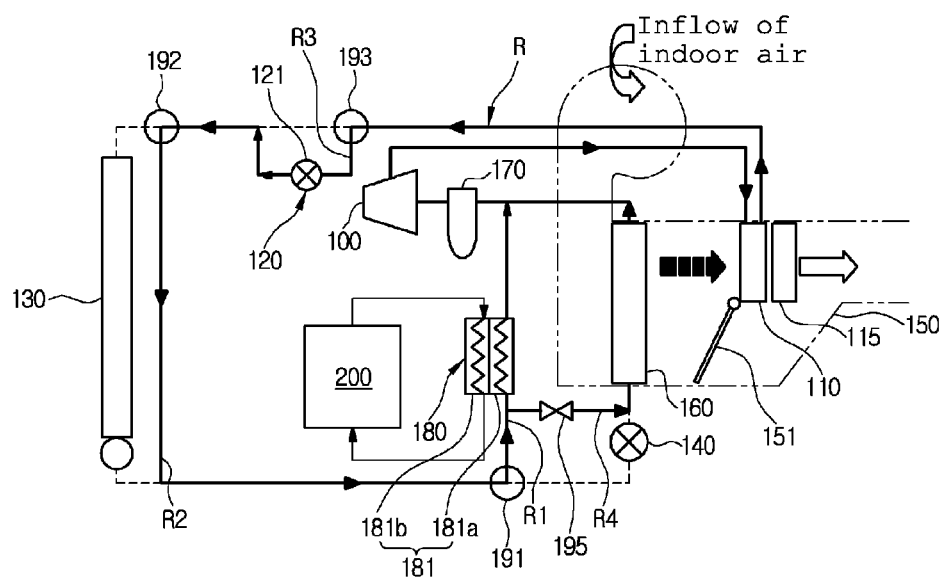
FIG. 6 is a configurative diagram of a dehumidification mode during an operation in the second heating mode of the heat pump mode of the heat pump system.

E. Dehumidification Mode of Second Heating Mode of Heat Pump Mode (See FIG. 6)

The dehumidification mode of the second heating mode of the heat pump mode is carried out in the case that dehumidification of the interior is needed during the second heating mode of FIG. 5.

Therefore, only different parts from the second heating mode of FIG. 5 will be described.

In the dehumidification mode, during the second heating mode, the branching line (R4) is additionally opened through the ON-OFF valve 195.

Moreover, in the dehumidification mode, the temperature adjustable door 151 inside the air-conditioning case 150 closes the passage bypassing the interior heat exchanger 110, so that the air blown into the air-conditioning case 150 by the blower is cooled while passing through the evaporator 160, and then, the cool air is converted into warm air while passing through the interior heat exchanger 110 and supplied to the interior of the vehicle to thereby heat the interior of the vehicle.

In this instance, because the amount of refrigerant supplied to the evaporator 160 is small, an air cooling efficiency is low and a change of the indoor temperature is minimized, so that dehumidification of the air passing through the evaporator 160 is carried out smoothly.

Continuously, the refrigerant passing through the compressor 100, the interior heat exchanger 110, the second expansion means 120 and the second bypass line (R2) passes the first bypass line (R1) by the first direction changing valve 191. In this instance, some of the refrigerant passing the first bypass line (R1) heat-exchanges with the cooling water passing through the cooling water heat-exchanging part 181b and is evaporated while recovering the waste heat of the electronic units 200 of the vehicle during the process that the refrigerant passes through the refrigerant heat-exchanging part 181a of the water cooling type heat exchanger 181, and the other of the refrigerant is supplied to the evaporator 160 through the branching line (R4) and is evaporated while heat-exchanging with the air flowing inside the air-conditioning case 150.

In the above process, dehumidification of the air passing through the evaporator 160 is carried out, and the dehumidified air passing through the evaporator 160 is converted into warm air while passing through the interior heat exchanger 110, and then, is supplied to the interior of the vehicle to dehumidify the interior of the vehicle.

After that, the refrigerants respectively passing through the water cooling type heat exchanger 181 and the evaporator 160 are joined together, and then, the joined refrigerant is introduced into the compressor 100, and then, recirculates through the above cycle.

What is claimed is:

1. A heat pump system for a vehicle comprising:
a compressor mounted on a refrigerant circulation line for compressing and discharging refrigerant;
an interior heat exchanger mounted inside an air-conditioning case for exchanging heat between the air inside the air-conditioning case and the refrigerant discharged from the compressor;
an evaporator mounted inside the air-conditioning case for exchanging heat between the air inside the air-conditioning case and the refrigerant supplied to the compressor;
an exterior heat exchanger mounted outside the air-conditioning case for exchanging heat between the refrigerant circulating through the refrigerant circulation line and the outdoor air;
first expansion means mounted on the refrigerant circulation line of an inlet side of the evaporator for expanding refrigerant;
second expansion means mounted on the refrigerant circulation line located between the interior heat exchanger and the exterior heat exchanger for expanding refrigerant;
a controlling part for controlling the heat pump system to defrost whereby the controlling part determines that frosting is formed on the external heat exchanger by determining if a difference value between outdoor temperature and refrigerant temperature of an outlet side of the exterior heat exchanger is above a frosting decision temperature in a heat pump mode;
a first bypass line adapted to connect the refrigerant circulation line of an inlet side of the first expansion means and the refrigerant circulation line of an outlet side of the evaporator so that the refrigerant circulating through the refrigerant circulation line selectively bypasses the first expansion means and the evaporator; and
heat supplying means mounted on the first bypass line to supply waste heat of electronic units of the vehicle to the refrigerant flowing along the first bypass line,
wherein the controlling part additionally determines the waste heat of the electronic units supplied through the heat supplying means if the difference value is above the frosting decision temperature, and determines that frosting is formed on the external heat exchanger if the waste heat of the electronic units is below a reference value.

2. The heat pump system according to claim 1, wherein the controlling part additionally determines a decrease range of a discharge air temperature of the interior of the vehicle if the difference value is above the frosting decision temperature, and determines that frosting is formed on the external heat exchanger if the decrease range is above the reference value.

3. The heat pump system according to claim 1, wherein the frosting decision temperature is 10° C.

4. The heat pump system according to claim 1, wherein the controlling part controls the system to increase refrigerant pressure and temperature of the system during a defrosting control.

5. The heat pump system according to claim 2, wherein the reference value is 3° C.

6. The heat pump system according to claim 1, wherein the heat supplying means comprises a water cooling type heat exchanger, the water cooling type heat exchanger including: a refrigerant heat-exchanging part in which the refrigerant flowing along the first bypass line flows; and a cooling water heat-exchanging part which is disposed at one side of the refrigerant heat-exchanging part in such a way as to heat-exchange and in which cooling water circulating through the electronic units of the vehicle flows.

7. The heat pump system according to claim 1, wherein the waste heat of the electronic units is temperature of cooling water circulating through the electronic units.

* * * * *